Feb. 15, 1927.  1,618,048
E. G. BATES ET AL
PROCESS OF MAKING AND HOLDING DIES FOR CUTTING PAPER FIGURES
Filed Sept. 8, 1924  5 Sheets-Sheet 1

Inventors
Edwin G. Bates
Raymond C. Bates
By their Attorneys

Feb. 15, 1927. 1,618,048
E. G. BATES ET AL
PROCESS OF MAKING AND HOLDING DIES FOR CUTTING PAPER FIGURES
Filed Sept. 8, 1924 5 Sheets-Sheet 2
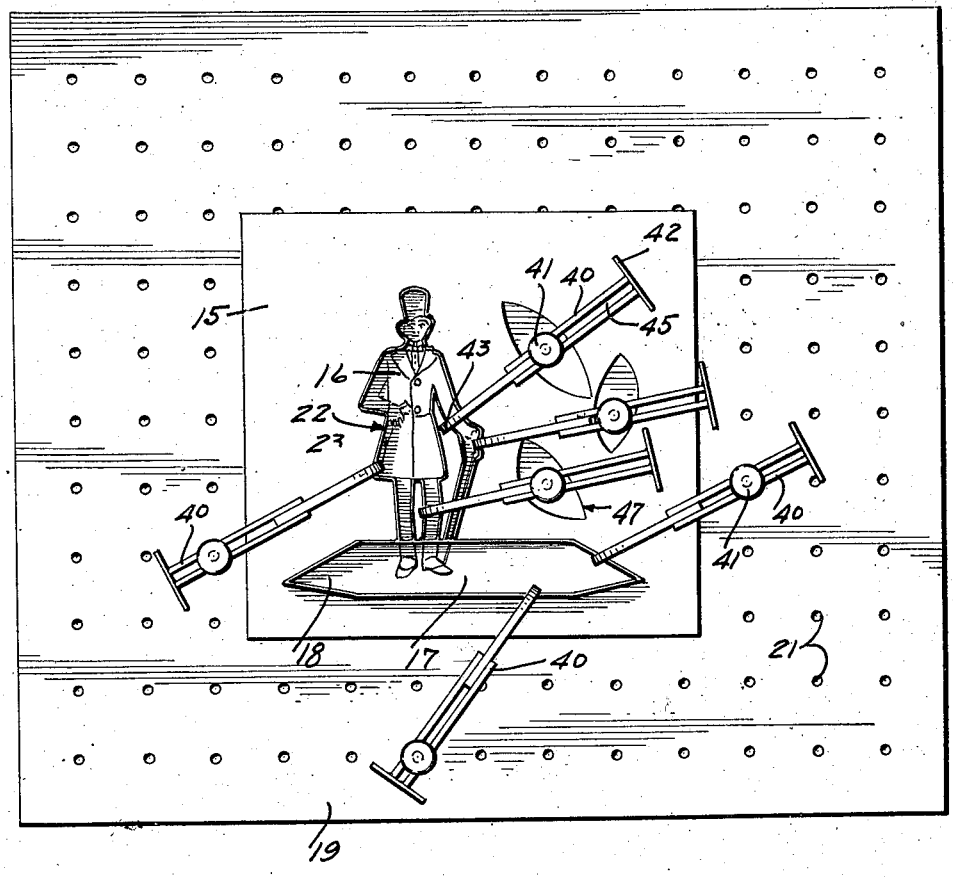
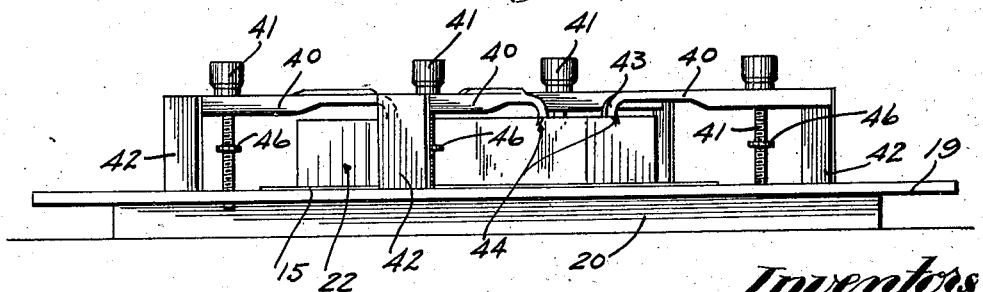

Feb. 15, 1927.
E. G. BATES ET AL
1,618,048
PROCESS OF MAKING AND HOLDING DIES FOR CUTTING PAPER FIGURES
Filed Sept. 8, 1924  5 Sheets-Sheet 3
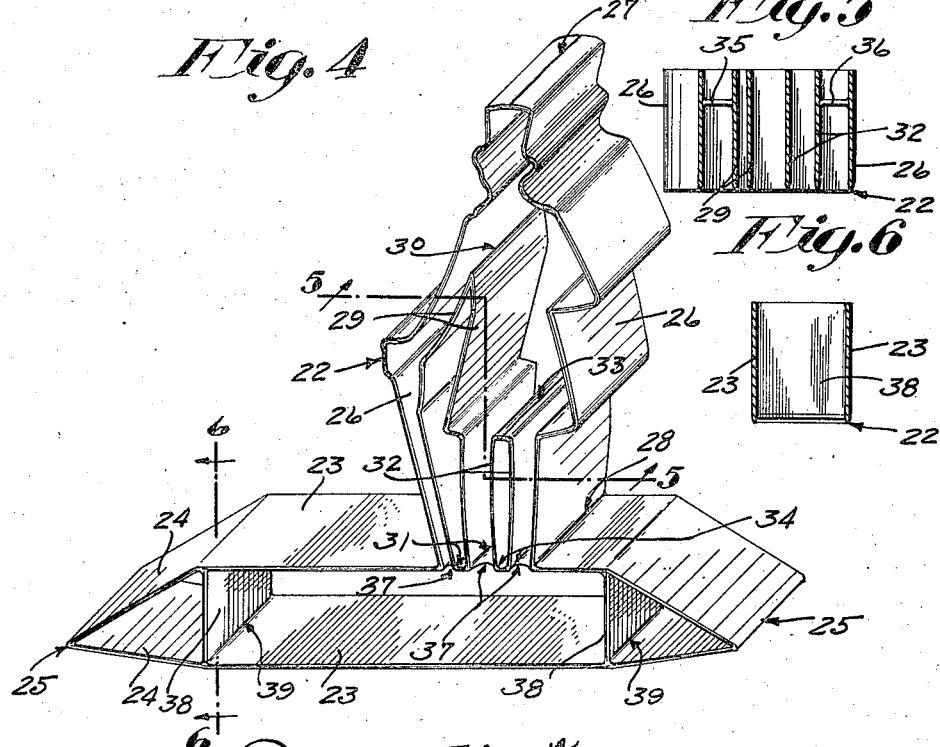
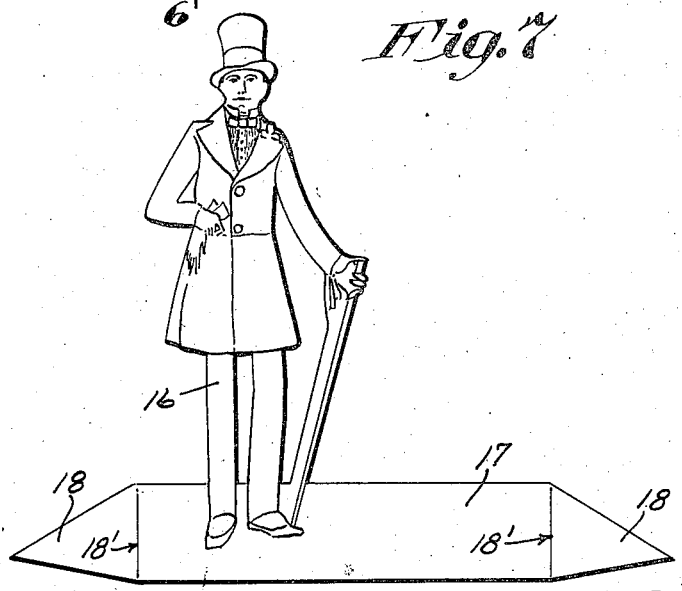
Inventors
Edwin G. Bates
Raymond C. Bates
By their Attorneys
Merchant and Kegore Feb. 15, 1927.
E. G. BATES ET AL
1,618,048
PROCESS OF MAKING AND HOLDING DIES FOR CUTTING PAPER FIGURES
Filed Sept. 8, 1924    5 Sheets-Sheet 4
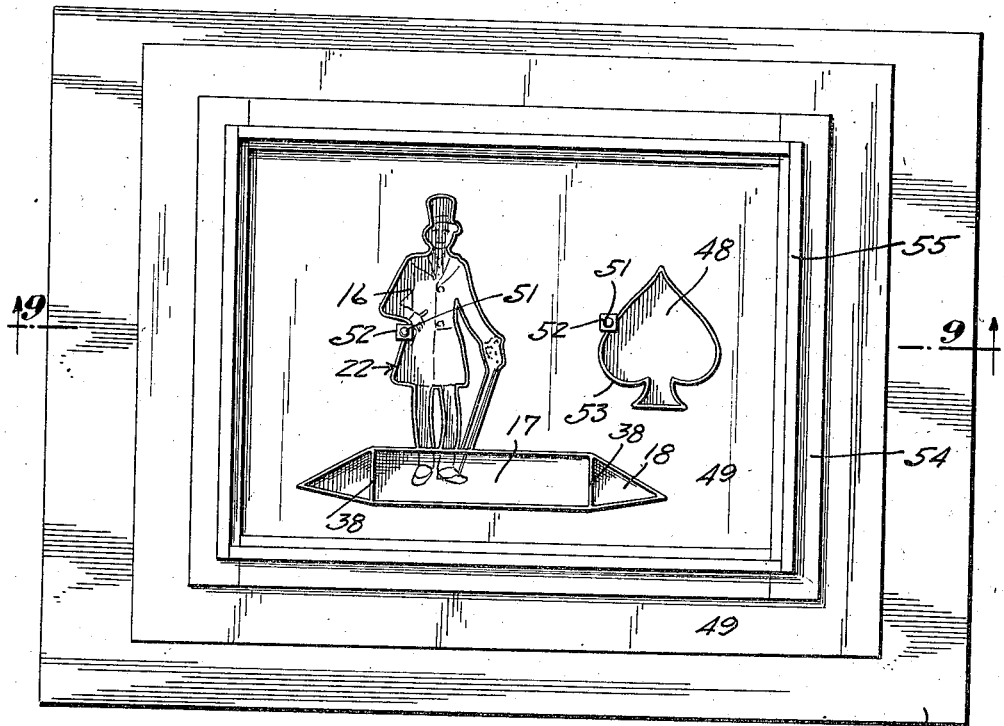
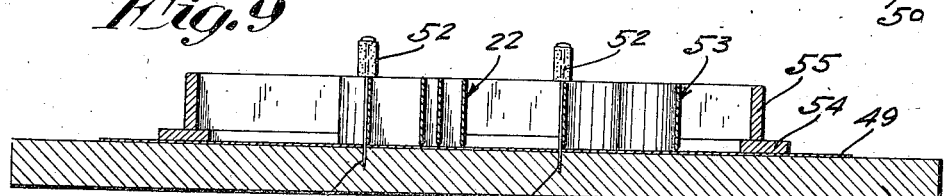
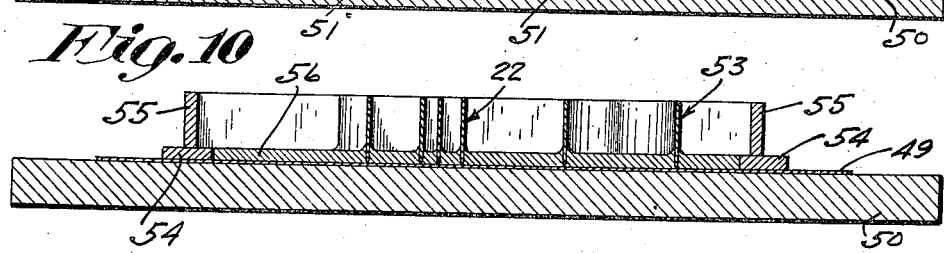
Inventors
Edwin G. Bates
Raymond C. Bates
By their Attorneys Feb. 15, 1927. 1,618,048
E. G. BATES ET AL
PROCESS OF MAKING AND HOLDING DIES FOR CUTTING PAPER FIGURES
Filed Sept. 8, 1924   5 Sheets-Sheet 5
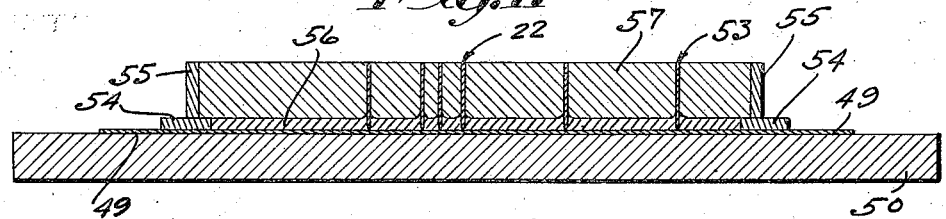
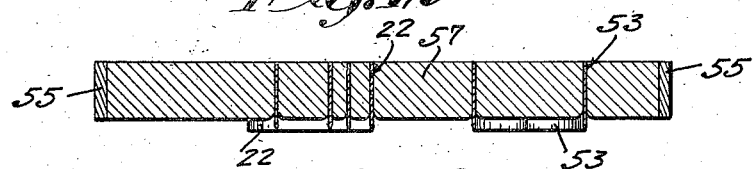
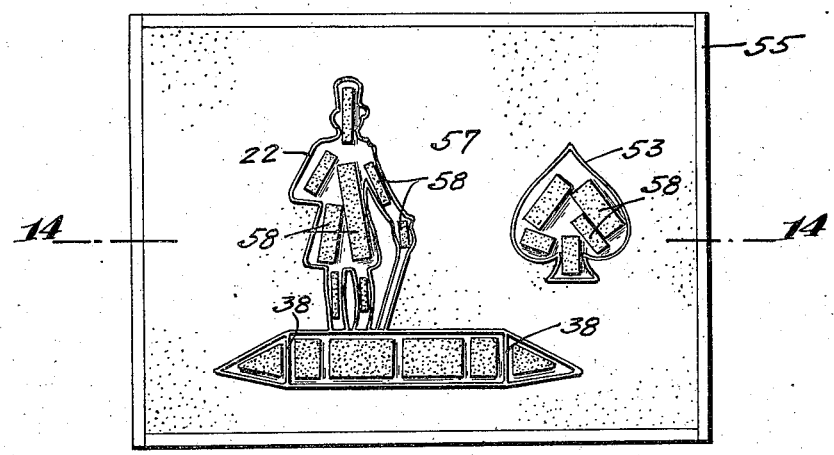
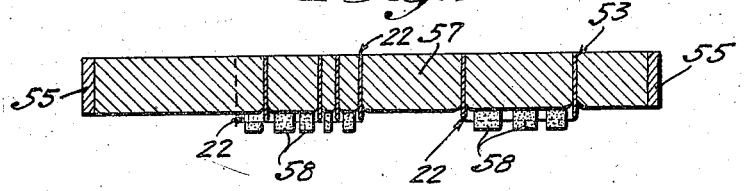
Inventors
Edwin G. Bates
Raymond C. Bates
By their Attorneys
Merchant and Keegan Patented Feb. 15, 1927.

1,618,048

UNITED STATES PATENT OFFICE.

EDWIN G. BATES AND RAYMOND C. BATES, OF MINNEAPOLIS, MINNESOTA; SAID RAYMOND C. BATES ASSIGNOR TO SAID EDWIN G. BATES, OF MINNEAPOLIS, MINNESOTA.

PROCESS OF MAKING AND HOLDING DIES FOR CUTTING PAPER FIGURES.

Application filed September 8, 1924. Serial No. 736,497.

Our invention provides an improved process of forming and holding dies for cutting from paper stock or the like various different figures or objects such as dinner cards, valentines, posters, boxes and the like.

Said invention also relates to an improved apparatus for use in carrying out our improved process, and to such ends it consists of the novel devices and combinations of devices hereinafter described and defined in the claims.

In the accompanying drawings, which illustrate the invention, like characters indicate like parts throughout the several views:

Referring to the drawings:

Fig. 2 is a plan view showing the copy sheet on an assembly plate, and around the figure thereon are assembled the several sections of the die held in position by means of a plurality of clamps secured to the assembly plate;

Fig. 3 is a front view of the parts shown in Fig. 2;

Fig. 4 is a perspective view of the completed die, on an enlarged scale;

Fig. 5 is a detail view in section taken on the irregular line 5—5 of Fig. 4;

Fig. 6 is a detail view in section taken on the line 6—6 of Fig. 4;

Fig. 7 is a plan view of the completed dinner card;

Fig. 8 is a plan view of a positioning board, a positioning sheet, dies, depth frame and holding frame;

Fig. 9 is a sectional view taken on the line 9—9 of Fig. 8;

Fig. 10 is a view corresponding to Fig. 9 but further showing paraffin poured into the dies and depth frame;

Fig. 11 is a view corresponding to Fig. 10 but further showing plaster of Paris poured on the paraffin and completely filling the dies and holding the frame;

Fig. 12 is a sectional view of the dies mounted in the holding frame with the paraffin removed to expose the cutting edges of the dies;

Fig. 13 is a face view of the parts shown in Fig. 12 and further showing pieces of cork cemented to the bodies of cement in the dies and projecting outward of the cutting edges thereof; and Fig. 14 is a sectional view taken on the line 14—14 of Fig. 13.

Figure 1:
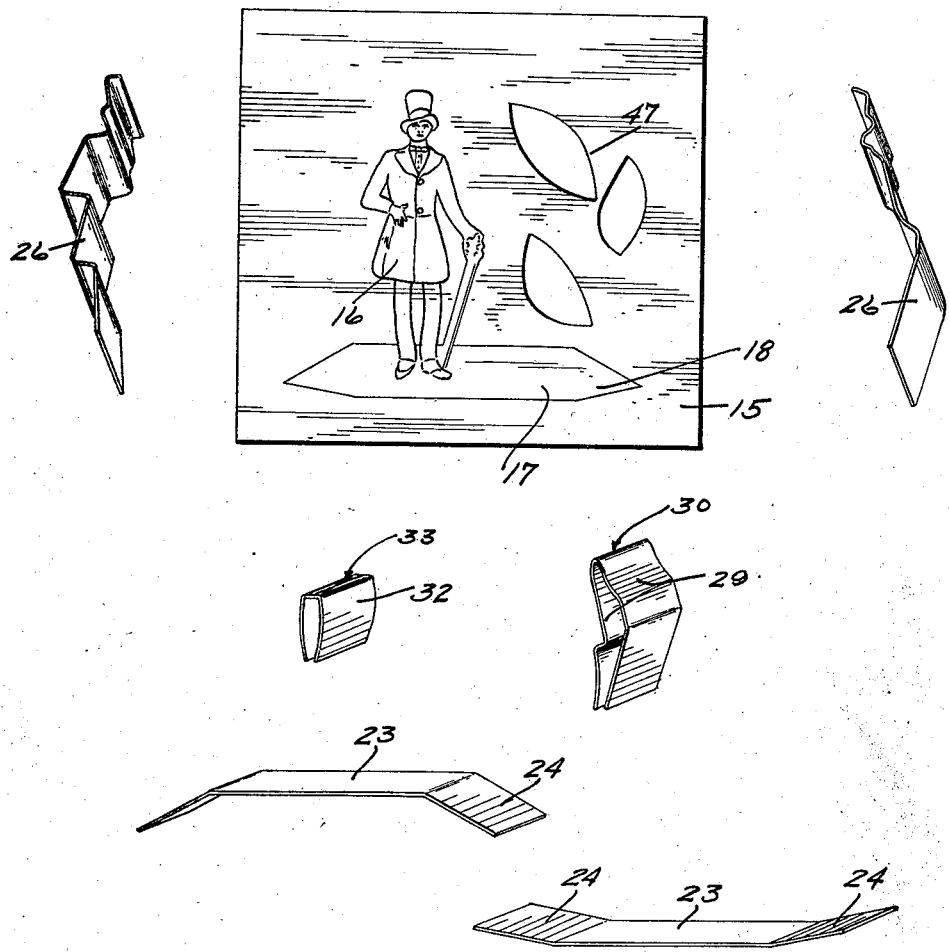
Fig. 1 illustrates in plan a copy sheet having printed thereon a dinner card representing St. Patrick, and also illustrating in perspective the several sections of a die for cutting such figures.

The numeral 15 indicates a rectangular piece of paper stock hereinafter referred to as a copy sheet on which is printed a figure 16 representing St. Patrick to be used as a pattern while forming a die to cut such printed figures from sheets of paper stock, to be used as dinner cards, one of which is shown on Fig. 7. Also cut from the paper stock with the figure 16 is a base 17 having tapered end extensions 18 which, when turned backward, will support said figure in an upright position but slightly backward inclined due to the tapered under edges of said end extensions. To make these end extensions 18 bend easily at the proper places, the paper stock is scored at 18'.

While forming a die for cutting the figure 16, base 17, end extensions 18 and producing the scoring lines 18', the copy sheet 15 is placed on a flat assembly plate 19, preferably aluminum, secured to a base 20, preferably wood or other light material, and has drilled and tapped therein a plurality of longitudinal and transverse rows of holes 21. One of the purposes of making the assembly plate 19 of aluminum and its base 20 of wood is for the sake of lightness and a further important object in making the assembly plate 19 of aluminum is that solder will not stick thereto while soldering the ends of the die sections. It will be noted that the base 20 is of such size that the marginal edge portion of the assembly plate 19 extends outward thereof, thus making it extremely easy to pick up the assembly plate 19.

The completed die for cutting the figure 16 is indicated as an entirety by the numeral 22 and comprises a plurality of sections of steel cutting rule, one of the longitudinal edges of which is sharp, bent to the contour of the figure 16, base 17, and end extensions 18, and which sections are rigidly connected by solder. As shown, the die 22 includes two horizontal base sections 23 having converging end extensions 24 connected at their abutting ends by solder 25; a pair of upright side sections 26 connected at their abutting upper ends by solder 27 and having their laterally spaced lower ends secured to the upper base sections 23 by solder 28; a pair of inside upright sections 29 having their abutting upper ends connected by solder 30 and their laterally spaced lower ends secured to the upper base section 23 by solder 31; and a pair of upright inside sections 32 having their abutting upper ends connected by solder 33 and their laterally spaced lower ends secured to the upper base section 23 by solder 34. The base sections 23 follow the contour of the base 17, and their extensions 24 follow the contours of the end extensions 18. The side sections 26 follow the irregular outer contour of the figure 16, and the sections 29 and 32 follow certain contours of the figure 16 to make inside cuts. A relatively narrow cross-tie bar 35 has one its ends soldered to one of the sections 29 and its other end soldered to the adjacent section 26 to hold the sections 29 in their proper upright position in respect to the sections 26. A similar cross-tie bar 36 has one of its ends soldered to one of the sections 32 and its other end soldered to the adjacent section 26 to hold the sections 32 in their proper upright position in respect to the sections 26.

To prevent the upper base section 23 from cutting the figure 16 from the base 17, said section is notched at its cutting edge between the sections 26 and the adjacent sections 29 and 32 and between the adjacent sections 29 and 32, as indicated at 37. Scoring blades 38 for producing the scoring lines 18' extend between the base sections 23 at the ends thereof and are rigidly secured thereto by solder 39. These scoring blades are formed from steel cutting rule and have their sharp edges spaced above the sharp edges of the sections 23 so as to simply score and not cut the paper stock.

As each section of the die 22 is formed, it is placed on the respective portion of the figure 16 which it represents and held in position by one or more clamps 40. Each clamp 40 comprises a horizontal finger-like body and a long thumb screw 41. Said body has, at its rear end, a wide transverse supporting foot 42, and, at its front end, a goose neck 43 with a transverse notch 44 to receive and hold the upper edge portion of a die section. The supporting foot 42 is adapted to rest on the assembly plate 19 or the copy sheet 15, and the thumb screw 42 extends through a longitudinal slot 45 in the body of the clamp 40 with its head impinging thereagainst and its lower end is screwed into one of the holes 21. A collar 46 on each thumb screw 41 inward of the body of the clamp 40, holds said body and thumb screw assembled when the clamp is removed from the assembly plate 19. In case the copy sheet 15 extends over the hole 21 in which the thumb screw 41 is to be screwed, a hole 47 may be cut in the copy sheet 15 to expose said hole.

After all of the sections of the die 22 are completed, assembled on the copy sheet 15 and held in position by means of the clamps 40, the assembly plate is held in a vertical position by means of a vise or otherwise and the ends of the die sections connected by solder to each other or other parts of the die sections. By thus holding the assembly plate 19, the same may be very easily turned so that the soldering may be accomplished in an easy manner. After the soldering of the die sections is completed, the clamps 40 are removed from the assembly plate 19 to release the completed die 26, as shown in Fig. 4.

It is of course understood that in making a die, one or a plurality of sections of cutting rule may be used and the joints made at any convenient place and connected by solder or otherwise. Any suitable tool or tools may be employed to bend the die sections to the exact shape of the figure or object they are intended to cut. In forming the die sections, the cutting edges of the rule must always be turned toward the copy sheet. Before the die is completely finished, the scoring blades 38 are soldered in position with their sharp edges spaced the proper distance above the cutting edge of the die 22.

It may be here stated that at the time the copy sheet 15 is printed, the entire number of sheets for the respective job are printed. Two or more figures or objects may be printed on a single sheet to prevent waste and to facilitate the cutting of the figures from the paper stock, and said figures may represent a single job or a plurality of jobs. In addition to the figure 16, there is also printed on the sheet therewith a heart-shaped figure 48.

In Fig. 8 is shown a sheet of paper stock selected from the job on which is printed the figures 16 and 48 and which sheet will hereinafter be referred to as a positioning sheet 49.

The positioning sheet 49 is placed on a wooden mounting board 50 and the die 22 is positioned over the figure 16 with its cutting edge resting on said sheet. The die 22 is temporarily held in this position by means of a pin 51 having just under its head a sleeve 52 of cork, rubber, or other resilient material. This pin 51 is pressed through the positioning sheet 49 and into the mounting board 50 with the lower end of its sleeve 52 engaging the upper edge portion of the die 22 under compression to hold said die where positioned. More than one pin 51 may be used, if necessary, to properly hold the die 22 in position. A die 53 for the figure 48 is positioned on said figure and held by one of the pins 51.

Placed on the positioning sheet 49 around the dies 22 and 53 is a shallow rectangular depth frame 54 made up of four loose slugs or bars. Resting on this frame 54 is a correspondingly formed holding frame 55 comprising rigidly connected slugs or bars set edgewise with their upper edges in the same plane as the upper edge of the die 22. Melted paraffin 56 is poured into the depth frame to the upper surface thereof and into the bodies of the dies 22 and 53 to a corresponding depth and allowed to set, as shown in Fig. 10. After the paraffin 56 has set, the pins 51 are removed as they are not necessary for the reason that the paraffin will properly hold the dies.

Plaster of Paris 57, in plastic form, is then poured on the paraffin within the holding frame 55 and bodies of the dies 22 and 53 so that said frame and dies are completely filled. While the plaster of Paris 57 is setting, a heating process takes place and the action thereof on the paraffin loosens and draws the same away from the contacting surfaces of the dies 22 and 53 and the depth frame 54 so that the paraffin 56 may be easily lifted from the dies when they are removed from the depth frame 54 to expose their cutting edges, as shown in Fig. 12.

Obviously, the bodies of plaster of Paris in the dies and surrounding the same rigidly hold said dies and secure the same to the holding frame 55. Pieces of cork 58 are then glued to the plaster of Paris 57 within the dies 22 and 53. The purpose of these cork pieces 58 is to press the paper stock from the dies after the cutting action has taken place. The holding frame 55 is then mounted in a press, not shown, to cut the figures from the printed paper stock as the same is fed to the press. After a job is completed, the plaster of Paris in the holding frame 55 may be broken up to release the individual dies with their bodies of cement from said frame so that they may be stored away for further use and may be again mounted in a holding frame either alone or with other figures.

In place of the paraffin 56, a resilient substance for instance such as used in making composition rollers, may be substituted therefor and left in the dies to take the place of the cork 58 for projecting the figures as they are cut by the dies. The dies are so designed as to cut the figures from the paper stock but not remove the same so that said figures are removed from the press with the waste material. In place of the cork 58, rubber or other resilient material may be used and the words "plaster of Paris" are herein used in a broad sense to cover any kind of cement for securing the dies in position. The words "cutting rule" are also used in a broad sense to cover any suitable material from which the dies may be formed.

The above described process and apparatus have in actual commercial usage proven highly efficient for the purpose had in view. Dies formed in accordance with our invention will cut figures or designs to their exact shape and may be made to cut very intricate designs and, at the same time, leave the outlines thereof very sharp.

What we claim is:

1. The process of forming a self-contained die from cutting rule which consists in shaping the same and securing the ends thereof, in partly filling in the completed die at its cutting edge with a molten substance and allowing the same to solidify, and in filling in the die with a cementitious material and allowing the same to solidify to form a body therefor.

2. The process defined in claim 1 including a further step in removing said substance.

3. The process of forming a self-contained die from cutting rule which consists in shaping the same and securing the ends thereof, in placing a frame around the die, in partly filling in the die at its cutting edge and the frame with a molten substance and allowing the same to solidify, and in filling in the die and the frame with a cementitious material and allowing the same to solidify to form the body of the die and secure said die to the frame.

4. The process defined in claim 3 including a further step in thereafter removing said substance.

5. The process of forming a self-contained die from cutting rule which consists in shaping the same and securing the ends thereof, in partly filling in the completed die at its cutting edge with a substance, and in filling in the die with a cementitious material and allowing the same to solidify, said material, while solidifying, producing an action on the substance to loosen the same from the die.

6. The process of forming a self-contained die from cutting rule which consists in shaping the same and securing the ends thereof, in supporting the cutting rule on its edge, in placing a depth frame around the die, in filling in the die and depth frame with a molten substance and allowing the same to solidify, in placing a holding frame on the depth frame, in filling in the die and the holding frame with a cementitious material and allowing the same to solidify to form a body for the die and secure said die to the holding frame.

7. The process defined in claim 6 including a further step in thereafter removing said substance and the depth frame from the die.

8. The process of forming a self-contained die which consists in shaping a plurality of cutting rule sections from a copy figure or design to be cut by the die, in placing a sheet containing said figure or design on an assembly plate, in placing said sections on said plate with their cutting edges resting on said sheet and temporarily securing the sheet and die sections to said plate for holding the die in registration with said figure or design, and in securing the ends of said sections to complete the die.

9. The process of mounting a die having a cutting edge which consists in placing a frame around the die, in filling in the die at its cutting edge and the frame with a molten substance and allowing the same to solidify, and in filling in the die and the frame with a cementitious material and allowing the same to solidify to form a body for the die and secure the die to the frame.

10. The process defined in claim 9 including a further step in removing said substance from the die and the frame.

11. The process defined in claim 9 in which said material, while solidifying, produces an action on the substance to loosen the same from the die and the frame.

12. The process of mounting a die formed from a cutting rule which consists in filling the die at its cutting edge with melted paraffin, in filling in the die with plaster of Paris, and in removing the paraffin after the plaster of Paris has set.

13. The process of mounting a die formed from a cutting rule which consists in placing a depth frame around the die, in filling in the die at its cutting edge, and the depth frame with melted paraffin, in placing a holding frame around the die, in filling in the holding frame and the die with bodies of cement, and in removing the paraffin after the plaster of Paris has set.

14. The process defined in claim 6 in which said material, while solidifying, produces an action on the substance to loosen the same from the die and the depth frame.

15. The process of forming two or more independent self-contained dies from cutting rule sections which consists in shaping each section from a copy figure or design to be cut by the respective die, in placing a sheet containing the figures or designs on an assembly plate, in placing said sections with their cutting edges resting on said sheet and temporarily securing the sheet and the sections to said plate for holding the die sections in registration with their respective figures or designs, and in securing the ends of the sections to complete the dies.

16. The process defined in claim 15 which includes a further step in placing a frame around the dies, in filling in the dies and the frame with a molten substance and allowing the same to solidify, and in filling in the dies and the frame with a cementitious material and allowing the same to solidify to form bodies for the dies and secure the dies to the frame.

17. The process defined in claim 15 which includes the further steps in placing a depth frame around the dies, in filling in the dies and the depth frame with a molten substance and allowing the same to solidify, in placing a holding frame on the depth frame, and in filling in the dies and the holding frame with a cementitious material and allowing the same to solidify to form bodies for the dies and secure the dies to the holding frame.

18. The process of forming two or more dies from cutting rules which consists in shaping each die around a copy figure or design, in placing the completed dies on the respective figures or designs with their cutting edges turned toward the same and temporarily holding the completed dies in position, in placing a depth frame around the dies, in filling in the dies and the depth frame with melted paraffin, in placing a holding frame around the dies, in filling in the dies and holding frame with bodies of plaster of Paris, and in removing the paraffin after the plaster of Paris has set.

19. The process of forming a die which consists in shaping the same from cutting rule, in placing a sheet having a copy figure or design to be cut by the die on an assembly plate, in placing the cutting rule with its cutting edge on the sheet in registration with the figure or design thereon, in placing holding pins through the sheet into the assembly plate and into engagement with the upper edges of the cutting rule, and in filling in the die while on the sheet with a molten substance and allowing the same to solidify.

20. The process defined in claim 19 which includes the further step of filling in the die on the solidified substance with a cementitious material and allowing the same to solidify.

21. The process defined in claim 19 including the further steps of filling in the die on the solidified substance with a cementitious material and allowing the same to solidify, and in removing the holding pins after the molten substance has solidified and before the cementitious material has been filled into the die.

22. The process defined in claim 19 in which said pins have yielding parts under strain to press the cutting rule onto the sheet.

In testimony whereof we affix our signatures.

EDWIN G. BATES.
RAYMOND C. BATES.